United States Patent
Yamazaki et al.

(10) Patent No.: US 8,585,086 B2
(45) Date of Patent: Nov. 19, 2013

(54) GAS GENERATOR

(71) Applicant: Daicel Corporation, Osaka (JP)

(72) Inventors: Masayuki Yamazaki, Tatsuno (JP); Naoki Matsuda, Tatsuno (JP)

(73) Assignee: Daicel Corporation, Osaka-shi (JP)

( * ) Notice: Subject to any disclaimer, the term of this patent is extended or adjusted under 35 U.S.C. 154(b) by 0 days.

(21) Appl. No.: 13/765,317

(22) Filed: Feb. 12, 2013

(65) Prior Publication Data

US 2013/0239839 A1   Sep. 19, 2013

Related U.S. Application Data

(60) Provisional application No. 61/612,713, filed on Mar. 19, 2012.

(30) Foreign Application Priority Data

Mar. 19, 2012 (JP) .................................. 2012-062163

(51) Int. Cl.
    *B60R 21/26* (2011.01)
(52) U.S. Cl.
    USPC ............................ 280/741; 280/736; 102/530
(58) Field of Classification Search
    USPC .................................. 280/736, 741; 102/530
    See application file for complete search history.

(56) References Cited

U.S. PATENT DOCUMENTS

| | | | |
|---|---|---|---|
| 5,106,119 A | 4/1992 | Swann et al. | |
| 5,503,806 A * | 4/1996 | Fulmer et al. | 422/164 |
| 5,613,705 A * | 3/1997 | Hock et al. | 280/741 |
| 6,032,979 A * | 3/2000 | Mossi et al. | 280/741 |
| 6,290,526 B1 * | 9/2001 | Minami et al. | 439/336 |
| 7,267,365 B2 * | 9/2007 | Quioc | 280/736 |
| 7,883,111 B2 * | 2/2011 | Blessing et al. | 280/741 |
| 7,891,703 B2 | 2/2011 | Chen et al. | |
| 2004/0061319 A1 * | 4/2004 | Saso et al. | 280/741 |
| 2005/0161924 A1 * | 7/2005 | Schoenhuber et al. | 280/741 |
| 2006/0186653 A1 * | 8/2006 | Schoenhuber | 280/741 |
| 2007/0273132 A1 * | 11/2007 | Smith et al. | 280/736 |
| 2011/0088583 A1 | 4/2011 | Morgan et al. | |

FOREIGN PATENT DOCUMENTS

EP   0 012 627 A2   6/1980

OTHER PUBLICATIONS

International Search Report and Written Opinion issued in International Application No. PCT/JP2013/056209 on Jun. 5, 2013.

* cited by examiner

*Primary Examiner* — Toan To
(74) *Attorney, Agent, or Firm* — Birch, Stewart, Kolasch & Birch, LLP

(57) ABSTRACT

A gas generator includes,
  a housing comprising circumferential wall plates of a diffuser shell and a closure shell,
  an ignition device chamber,
  a combustion chamber surrounding the ignition device chamber and containing a gas generating agent,
  an annular or flat-plate filter disposed facing the top plate and spaced from the circumferential wall plate,
  a first support including a disk-shaped portion abutting against and supporting an upper surface of the filter, including communication holes only at a section in contact with the filter,
  a second support including an annular flat portion abutting against and supporting a lower surface of the filter and cylindrical wall portion fixed to the housing.
A gap is formed between the top plate of the housing and the circumferential wall plate and the first support member, when a pressure inside the combustion chamber increases due to combustion and the top plate is deformed.

9 Claims, 7 Drawing Sheets

GAS GENERATOR

This nonprovisional application claims priority under 35 U.S.C. §119(a) to Patent Application No. 2012-62163 filed in Japan on 19 Mar. 2012 and 35 U.S.C. §119(e) to U.S. Provisional application No. 61/612,713 filed on 19 Mar. 2012, which are incorporated by reference.

BACKGROUND OF INVENTION

1. Field of Invention

The present invention relates to a gas generator for a restraining device such as an airbag system for a vehicle.

2. Description of Related Art

In a pyrotechnic gas generator using a solid gas generating agent, a filter is used for collecting combustion residues generated during actuation.

Combustion gas generated from the gas generating agent passes through the filter or collides therewith before the combustion gas is discharged from the housing, thereby causing the residues contained in the combustion gas to adhere to the filter and also reducing the temperature of the combustion gas.

For this reason, after actuation of the gas generator, the heat of the residues and the combustion gas is transferred to the filter and the filter is heated to a high temperature.

The filter is usually arranged inside the housing in direct contact with the housing or in indirect contact with the housing, being supported by another member. After actuation, the heat from the filter or combustion residues is gradually transferred to the housing. As a result, temperature of the housing rises.

The temperature of the housing rises slowly due to heat transfer from the filter or combustion residues after actuation of the gas generator, compared with the usual actuation time (in figures of milliseconds) of the gas generator. For example, in 2 to 3 minutes, the housing attains high temperature and therefore, when the deployed airbag is deflated and comes into contact with the housing, the airbag fabric may be melted by the heat. Further, if the occupant leans on a steering wheel after the airbag is deployed, the occupant can be adversely affected by the excessive increase in housing temperature.

Therefore, in the pyrotechnic gas generators, it is necessary to inhibit the excessive increase in temperature of at least the housing facing the occupant after actuation.

In U.S. Pat. No. 7,891,703, a retainer 11 disposed inside an inflator 12 covers the upper surface of a combustion chamber in which a filter 5 and a gas generating agent 4 are accommodated, and an engaging section 11a engaging with the upper end of a tube 6 is provided in the central portion of the retainer.

Further, a plurality of holes 11b is formed in the retainer 11, the difference in pressure between the inside and outside of the combustion chamber surrounded by the retainer 11 is reduced, the deformation of the retainer during actuation is inhibited, and the combustion gas leakage from the abutment surface of the filter 5 and the retainer 11 is prevented.

SUMMARY OF INVENTION

The present invention provides a gas generator including:
a diffuser shell which has a top plate and an upper circumferential wall plate provided with a gas discharge port, a closure shell which has a bottom plate and a lower circumferential wall plate, a housing, as an outer shell, obtained by joining and integrating only the upper circumferential wall plate and the lower circumferential wall plate,
in the housing,
an ignition device chamber defined by a cup-shaped container which accommodates an ignition device,
a combustion chamber defined to surround the ignition device chamber and charged with a gas generating agent,
an annular or flat-plate filter disposed to face the top plate and to be spaced from the upper circumferential wall plate,
a first support member abutting against and supporting an upper surface of the filter,
a second support member abutting against and supporting an lower surface of the filter,
the first support member including,
a disk-shaped portion and an annular wall portion, the disk-shaped portion provided with a plurality of communication holes formed only at a section in contact with the upper surface of the filter,
one surface of the disk-shaped portion abutting against the top plate, the other surface of the disk-shaped portion abutting against the upper surface of the filter, the annular wall portion abutting against a part of an outer circumferential surface of the filter;
the second support member including,
a substantially cylindrical wall portion and an annular flat portion formed at a circumference in one end of the substantially cylindrical wall portion, and
the substantially cylindrical wall portion being fixed to the housing, the annular flat portion abutting against the lower surface of the filter,
and, during actuation, a gap being formed between the top plate and the first support member; and a gap being formed between the upper circumferential wall plate and the first support member,
when a pressure inside the combustion chamber increases due to combustion gas generated by combustion of the gas generating agent and the top plate of the diffuser shell is deformed (, which may be called hereinafter as a first aspect of the invention).

The present invention provides a gas generator including:
a diffuser shell which has a top plate and an upper circumferential wall plate provided with a gas discharge port, a closure shell which has a bottom plate and a lower circumferential wall plate, a housing, as an outer shell, obtained by joining and integrating only the upper circumferential wall plate and the lower circumferential wall plate,
in the housing,
an ignition device chamber defined by a cup-shaped container which accommodates an ignition device,
a combustion chamber defined to surround the ignition device chamber and charged with a gas generating agent,
an annular or flat-plate filter disposed to face the top plate and to be spaced from the upper circumferential wall plate,
a single cup-shaped support member abutting against at least an upper surface of the filter to support the filter,
the single cup-shaped support member having a disk-shaped portion and a cylindrical wall portion formed at the circumference of the disk-shaped portion and provided with a communication hole, the disk-shaped portion being provided with a plurality of communication holes formed only at a section in contact with an upper surface of the filter,
one surface of the disk-shaped portion abutting against the top plate and the other surface of the disk-shaped portion abutting against the upper surface of the filter, and
at least a part of the cylindrical wall portion being arranged to abut against an outer circumference of the filter, an opening end of the cylindrical wall portion fixed to the housing,
and, during actuation, a gap being formed between the top plate and the first support member; and a gap being formed between the upper circumferential wall plate and the first support member, when a pressure inside the combustion chamber increases due to combustion gas generated by combustion of the gas generating agent and the top plate of the diffuser shell is deformed (, which may be called hereinafter as a second aspect of the invention).

BRIEF DESCRIPTION OF DRAWINGS

The present invention will become more fully understood from the detailed description given hereinbelow and the accompanying drawings which are given by way of illustration only, and thus are not limitative of the present invention and wherein.

DETAILED DESCRIPTION OF INVENTION

Figure 1:
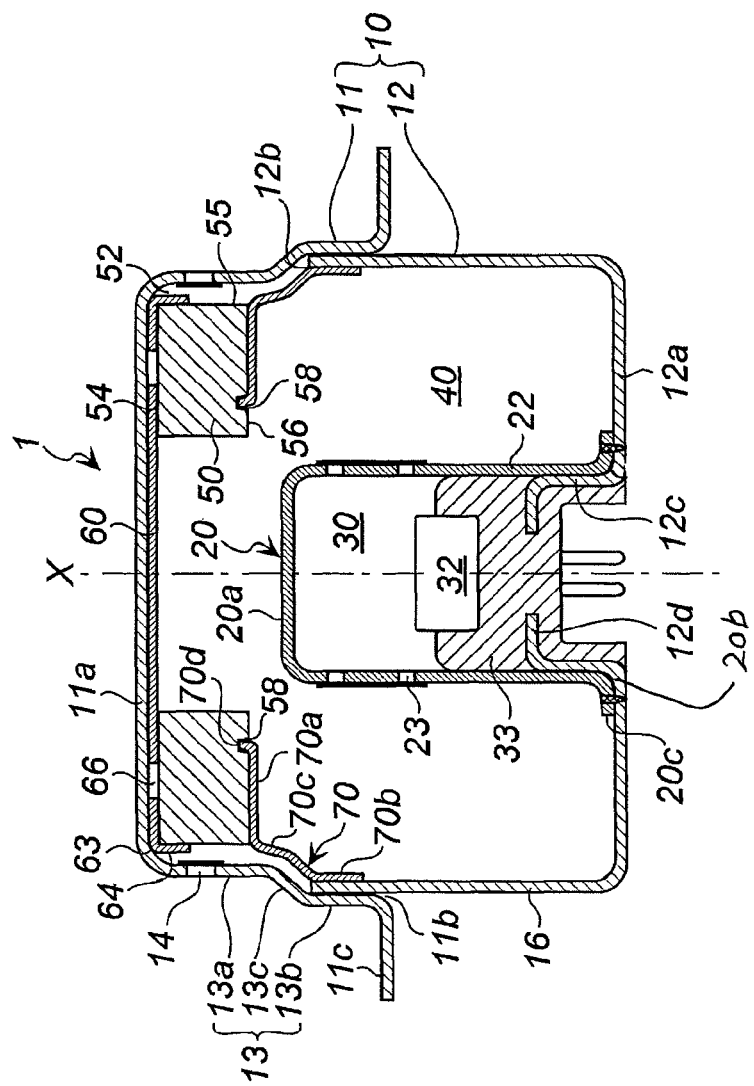
FIG. 1 shows a cross sectional view in the axis X direction of the gas generator of the present invention (a cross-sectional view illustrating the state prior to actuation).

In U.S. Pat. No. 7,891,703, the holes 11b in the retainer are also formed outside the portion which abuts on the upper surface of the filter 5, and part of the combustion gas is discharged from a gas discharge hole 2aa, without passing through the filter.

As a result, part of the combustion gas is discharged to the outside of the housing, without sufficient cooling and sufficient filtration of the combustion residue. In this respect, there is still room for improvement.

The present invention is below explained as preferable. It provides a gas generator in which an excess increase in temperature of a housing facing the occupant after actuation is inhibited and performance of a filter is maintained in a similar to or more effective way than that of a conventional filter.

In the gas generator in accordance with the present invention, a space (a heat-transfer inhibiting space) is formed between the top plate of the housing (the top plate of the diffuser shell) and the first support member during actuation, whereby the transfer of heat accumulated in the filter or in the combustion residues to the top plate of the housing (heat transfer) and the increase in temperature of the top plate of the housing are prevented.

The filter has an annular or flat plate shape and is arranged such that one surface thereof faces the top plate of the diffuser shell, the other surface faces the bottom plate of the closure shell, and the outer circumferential surface faces the upper circumferential wall plate.

The upper surface of the filter is abutted against and supported by the first support member, and the lower surface is abutted against and supported by the second support member.

The first support member has a disk-shaped portion, and the disk-shaped portion has a plurality of communication holes only in a section that is in contact with the upper surface of the filter Further, the first support member is disposed such that one surface of the disk-shaped portion is abutted against the top plate and the other surface of the disk-shaped portion is abutted against the upper surface of the filter before the gas generator is actuated.

The outer diameters of the disk-shaped portion of the first support member and the filter are adjusted to be less than the opposing inner diameter of the upper circumferential wall plate of the diffuser shell and such that a gap is formed between the filter and the upper circumferential wall plate.

The second support member has a substantially cylindrical wall portion and an annular flat portion formed at a circumference on one end of the substantially cylindrical wall portion.

In order to prevent the heat accumulated in the filter or in the combustion residues accumulated therearound after actuation from transferring to the top plate of the diffuser shell, it is possible to direct the heat to a circumferential wall plate of the housing or the closure shell via the second support member. In this case, the annular flat portion is disposed so as to be in contact with half or more of the cross-sectional area of the lower surface of the filter in order to transfer the heat of the filter or combustion residues to the second support member.

The substantially cylindrical wall portion is fixed to the housing (to a circumferential wall plate including the upper circumferential wall plate and the lower circumferential wall plate), and the annular flat portion is disposed to be abutted against the lower surface of the filter.

It is preferred that the outer diameter of the substantially cylindrical wall portion and the inner diameter of the circumferential wall plate be adjusted such that the substantially cylindrical wall portion is press-fitted into the circumferential wall plate.

The position at which the substantially cylindrical wall portion is fixed to the circumferential wall plate is set within a range of 0.2 H to 0.9 H, preferably within a range of 0.3 H to 0.8 H from the bottom plate, where H is the height from the bottom plate to the top plate, so as to minimize the heat transfer from the filter and the combustion residues located therearound to the top plate via the second support member and the circumferential wall plate.

In the gas generator in accordance with the present invention, a heat transfer inhibiting space is formed between the top plate and the first support member during actuation.

In this case, from the standpoint of heat transfer inhibition, it is preferred that the top plate and the first support member be completely separated from each other, but the top plate and the first support member may be in partial contact with each other if the heat transfer is allowed to such an extent that no adverse effect is caused on the occupants.

In the gas generator in accordance with the present invention, no heat transfer inhibiting space is formed and the first support member is in contact with the top plate prior to actuation (it is not necessary that the two members be in press-contact with each other). This is advantageous since the housing volume can be reduced, the attachment space for the gas generator is not bulky, and a compact gas generator can be designed.

When the gas generator in accordance with the present invention is actuated, the combustion gas generated in the combustion chamber is discharged from the gas discharge port after passing through the filter.

In this case, the heat transfer inhibiting space is formed between the top plate and the first support member, but part of the combustion gas is discharged from the gas discharge port after passing through the communication holes formed only in a section where the disk-shaped portion of the first support member is in contact with the upper surface of the filter and flowing into the heat transfer inhibiting space.

Since the gas that has flown into the space through the communication holes of the first support member always passes through the filter, the high-temperature residues contained in the combustion gas are prevented from directly adhering to the inner surface side of the top plate and the occurrence of gradual increase in the temperature of the top plate after actuation is prevented.

In the gas generator in accordance with the present invention, the total opening surface area (A1) of the communication holes of the first support member may be associated with the cross-sectional area (A2) of a passage formed between the first support member and the second support member and with the total opening surface area (A3) of the gas discharge port.

In the gas generator in accordance with the present invention, it is preferred that A1+A2>A3 be satisfied. In this case, when the pressure inside the combustion chamber rises during actuation, the combustion gas flows rapidly through the communication holes of the first support member to the outside of the combustion chamber (a gap between the first support member and the top plate of the housing; this is a state in which the heat transfer inhibiting space has not yet been formed), and the top plate is deformed outward under the pressure of the combustion gas. The heat transfer inhibiting space is thus formed between the top plate and the first support member. Since it is desirable that the combustion gas flow mainly into the passage formed by the first support member and the second support member, A1<A2 can be set (for example, A2/A1=50).

However, since the difference in pressure between the combustion chamber and the heat transfer inhibiting space is small due to the plurality of communication holes of the first support member, the first support member is hardly deformed.

Further, since the top plate of the housing does not return to the original shape after the deformation, the heat transfer inhibiting space is maintained.

In the filter that has been heated to a high temperature due to the adhesion of combustion residues after actuation, the upper surface of the filter remains abutting against the first support member and the heat of the filter is transferred to the first support member. However, since the heat transfer inhibiting space is present, the heat of the first support member is thermally insulated by the heat transfer inhibiting space and unlikely to move to the top plate of the housing. Therefore, the increase in temperature of the top plate of the housing is prevented.

As for a ratio of A1 and A2 to A3, from the standpoint of demonstrating the above-described effect, it is preferred that (A1+A2)/A3 be within a range of 3 to 100, more preferably 4 to 80.

When the diffuser shell and closure shell of the housing are assembled, the shells may be joined in a state in which at least the upper circumferential wall plate and the lower circumferential wall plate are in contact with each other, and a ratio of the lengths of the upper circumferential wall plate and the lower circumferential wall plate is not restricted.

In the above invention, the gas generator is preferably provided wherein a circumferential wall step is formed in a circumferential wall plate including the upper circumferential wall plate and the lower circumferential wall plate, the second support member has an annular step between the substantially cylindrical wall portion and the annular flat portion, a step surface of the annular step is formed to be abutted against a step surface of the circumferential wall step, a gap is present between the step surface of the circumferential wall step and the step surface of the annular step prior to actuation, and the step surface of the annular step is abutted against the step surface of the circumferential wall step during actuation.

This invention provides a means for further facilitating the formation of the heat transfer inhibiting space during actuation.

Since the step surface of the annular step of the second support member is abutted against the step surface of the circumferential wall step of the housing during actuation, the second support member is prevented from moving towards the top plate, of the housing. Therefore, a sufficient heat transfer inhibiting space is ensured. Further, the gas discharge port is not closed by the second support member.

Further the above invention preferably provides the gas generator, wherein the second support member further has a protrusion that protrudes towards the top plate of the diffuser shell at a circumference of the annular flat portion, the filter has a depression for inserting the protrusion at the lower surface abutted against the annular flat portion, and the second support member is arranged such that the substantially cylindrical wall portion is fixed to the housing, the annular flat portion is abutted against the lower surface of the filter, and the protrusion is inserted into the depression in the lower surface of the filter.

The protrusion of the second support member may be an annular protrusion or a plurality of independent protrusions.

The depression of the filter is in a shape and a size such that the protrusion(s) is inserted therein.

With such a configuration, the filter is easily positioned when the gas generator is assembled, and the position of the filter is maintained after the gas generator is assembled.

Further, the above invention preferably provides the gas generator, wherein a plurality of concave portions concaved to an inside of the housing are formed with a spacing therebetween in the top plate of the diffuser shell or in a boundary section of the top plate and the upper circumferential wall plate of the diffuser shell, the first support member has the annular wall portion at a circumference of the disk-shaped portion, and a distal end of the plurality of concave portion is abutted against a portion including a boundary section of the disk-shaped portion and the annular wall portion of the first support member.

The first support member has an annular wall portion at the circumference of the disk-shaped portion, and the filter may be press-fitted into the annular wall portion.

Further, since the annular wall portion is provided to position the first support member and the filter, and inhibit the displacement after assembling with the gas generator, the dimensions of the annular wall portion is adjusted appropriately provided that a length thereof is such that the above positioning and inhibiting purposes can be attained.

In the gas generator according to this invention, a plurality of concave portions are formed with a spacing in the circumferential direction at the top plate of the diffuser shell or at a boundary section between the top plate and the upper circumferential wall plate of the diffuser shell. When viewed from the inside of the housing, the plurality of concave portions is a plurality of convex portions that protrude inward of the housing, and the spaces between the plurality of convex portions are a plurality of concave portions.

In accordance with the present invention, in a state prior to actuation, the distal ends of the plurality of concave portions (convex portions protruding inward of the housing) are abutted against a portion including the boundary section of the disk-shaped portion and the annular wall portion of the first support member, and this state is also maintained during actuation.

Therefore, the first support member is in contact only with the convex portions protruding inward of the housing, and a gap is present between the first support member and the concave portions located between the convex portions.

As a result, the contact surface area of the first support member and the top plate of the diffuser shell is decreased, thereby limiting heat transfer to the top plate, and the gap serves as a discharge path for the combustion gas that has passed through the filter.

Since the first support member is abutted against the convex portions protruding inward of the housing even after actuation, the occurrence of noise caused by moving of the first support member, the filter and the second support member is also prevented.

In order to obtain the same effect, instead of forming a plurality of concave portions (concave portions and convex portions) at the boundary section of the diffuser shell, it is also possible to form the concave portions and convex portions at the boundary section of the disk-shaped portion and the annular wall portion of the first support member, and to form a gap between the diffuser shell and the boundary section.

In the above invention, the second support member can be formed from a metal with a thermal conductivity higher than that of the first support member.

In such case, since the heat of the filter or combustion residues located around the filter is easily transferred to the second support member side, the effect of inhibiting the transfer of heat to the top plate of the housing is enhanced.

In the second aspect of the invention, the single cup-shaped support member is used instead of two support members, namely, the first support member and the second support member, used in the above invention.

The disk-shaped portion of the cup-shaped support member corresponds to the disk-shaped portion of the first support member in the first aspect of the invention.

The cylindrical wall portion on the opening end side of the cup-shaped support member corresponds to the substantially cylindrical wall portion of the second support member. The cylindrical wall portion connects the disk-shaped portion and the substantially cylindrical wall portion in the first aspect of the invention and has a plurality of gas communication holes formed in a section corresponding to the outer circumferential surface of the filter.

The total opening surface area (A1) of the communication holes formed in the disk-shaped portion, the total opening surface area (A4) of the gas communication holes of the cylindrical wall portion, and the total opening surface area (A3) of the gas discharge port of the diffuser shell satisfy A1+A4>A3. Since it is preferred that the combustion gas mainly flow through the gas communication holes (A4) of the cylindrical wall portion, A1<A4 can be set (for example, A4/A1=50).

As for a ratio of numerical values, it is preferred that (A1+A4)/A3 be within a range of 3 to 100, more preferably 4 to 80.

The cup-shaped support member is disposed such that one surface of the disk-shaped portion is abutted against the top plate, the other surface of the disk-shaped portion is abutted against the upper surface of the filter, and part of the cylindrical wall portion is abutted against the outer circumferential surface of the filter.

The outer diameters of the disk-shaped portion of the cup-shaped support member and the filter are less than the opposing inner diameter of the upper circumferential wall plate of the diffuser shell and adjusted such that a gap is formed between the filter and the upper circumferential wall plate.

The remaining portion of the cylindrical wall portion of the cup-shaped support member is fixed to the housing (the circumferential wall plate including the upper circumferential wall plate and the lower circumferential wall plate).

It is preferred that the outer diameter of the cylindrical wall portion and the inner diameter of the circumferential wall plate be adjusted such that the cylindrical wall portion is press-fitted into the circumferential wall plate.

The position at which the cylindrical wall portion is fixed to the circumferential wall plate is preferably set within a range of 0.2 H to 0.9 H, more preferably within a range of 0.3 H to 0.8 H from the bottom plate, where H is the height from the bottom plate to the top plate, so as to minimize the heat transfer from the filter to the top plate via the cup-shaped support member and the circumferential wall plate.

The inner diameter of the portion of the cylindrical wall portion of the cup-shaped support member, which is abutted against the outer circumferential surface of the filter, and the outer diameter of the filter are adjusted such that when the filter is disposed inside the cup-shaped support member, the filter is press-fitted into and fixed to the cup-shaped support member.

When the diffuser shell and closure shell of the housing are assembled, the shells may be joined in a state in which at least the upper circumferential wall plate and the lower circumferential wall plate are in contact with each other, and a ratio of the lengths of the upper circumferential wall plate and the lower circumferential wall plate is not restricted.

In the second aspect of the invention, it is preferable in the gas generator that the cup-shaped support member has the disk-shaped portion, a cylindrical wall portion formed at a circumference of the disk-shaped portion, and a protrusion formed in an inner circumferential surface of the cylindrical wall portion, and the disk-shaped portion has the plurality of communication holes only in a section that is in contact with the upper surface of the filter, one surface of the disk-shaped portion is abutted against the top plate, and the other surface of the disk-shaped portion is abutted against the upper surface of the filter, the protrusion is abutted against a circumference of a lower surface of the filter, and at least part of the cylindrical wall portion is arranged to be abutted against an outer circumferential surface of the filter.

In this invention, the disk-shaped portion of the cup-shaped support member corresponds to the disk-shaped portion of the first support member in the first aspect of the invention, and the combination of the cylindrical wall portion and protrusion of the cup-shaped support member corresponds to the combination of the substantially cylindrical wall portion and annular flat portion of the second support member in the first aspect of the invention.

When the filter is disposed inside the cup-shaped support member, the filter is press-fitted into the cup-shaped support member and fixed thereto in the same manner as in the second aspect of the invention, and the lower surface on the outer circumferential surface side of the filter is supported by the protrusion. A plurality of depressions may be formed in the circumferential direction at the cylindrical wall portion, or an annular depression may be formed.

In the second aspect of the invention, it is preferable that a circumferential wall step is formed in a circumferential wall plate including the upper circumferential wall plate and the lower circumferential wall plate, the cup-shaped support member has an annular step at the cylindrical wall portion, a step surface of the annular step is formed to be abutted against a step surface of the circumferential wall step, a gap is present between the step surface of the circumferential wall step and the step surface of the annular step prior to actuation, and the step surface of the annular step is abutted against the step surface of the circumferential wall step during actuation.

This invention provides a means for further facilitating the formation of the heat transfer inhibiting space during actuation.

The step surface of the annular step of the cylindrical wall portion) is abutted against the step surface of the circumferential wall step of the housing during actuation, thereby preventing the cup-shaped support member from moving towards the top plate of the housing. As a result, sufficient heat transfer inhibiting space can be ensured.

In the second aspect of the invention, it is preferable in the gas generator that the annular or flat-plate filter is supported by the single cup-shaped support member abutted against at least the upper surface of the filter, and an annular member having an annular flat portion and an annular wall surface, and in the annular member, the annular wall surface is abutted against the cylindrical wall portion of the cup-shaped support member, and the annular flat portion is abutted against the lower surface of the annular or flat-plate filter.

The filter is supported by an annular member having an annular flat portion and an annular wall surface, in addition to the cup-shaped support member.

In the gas generator in accordance with the present invention, performance of a filter is maintained in a similar to or more effective way than that of a conventional filter, and heat transfer from the combustion residues or the filter that accumulated heat after actuation is inhibited, thereby preventing the increase in temperature of the housing facing the occupant.

DESCRIPTION OF EMBODIMENTS (1) Gas Generator Shown in FIG. 1

An embodiment of a gas generator 1 in accordance with the present invention will be explained below with reference to FIG. 1.

A housing 10 is obtained by integrating a diffuser shell 11 and a closure shell 12 by welding.

The diffuser shell 11 has a top plate 11a and an upper circumferential wall plate 13 and is of a cup-like shape having an opening 11b. The opening 11b is provided with a flange 11c.

The upper circumferential wall plate 13 has a smaller inner diameter in the top plate 11a side (a reduced diameter part 13a) and a larger inner diameter in the opening 11b side (an enlarged diameter part 13b), and a circumferential wall step 13c is formed between the reduced diameter part 13a and the enlarged diameter part 13b.

A plurality of gas discharge ports 14 is formed in the reduced diameter part 13a. The gas discharge ports 14 are closed with a closing member such as a seal tape from the inside prior to actuation, and thereby, an air-tight state is maintained inside the housing 10.

The closure shell 12 has a bottom plate 12a and a lower circumferential wall plate 16 and is of a cup-like shape having an opening 12b. The lower circumferential wall plate 16 has a uniform diameter.

A cylindrical part 12c protruding inward of the housing and an annular flat portion 12d protruding radially inward from the upper end of the cylindrical part 12c are formed in the central section of the bottom plate 12a, thereby forming a hole concentric with the axis X.

The opening 12b is inserted into the opening 11b (the enlarged diameter part 13b) of the diffuser shell 11, and the diffuser shell 11 and the closure shell 12 are integrated by welding only in this inserted portion.

Inside the housing 10, a cup-shaped container 20 is disposed, from the opening 12b, to cover the cylindrical part 12c of the bottom plate 12a of the closure shell.

The cup-shaped container 20 has a bottom surface 20a and a circumferential wall 22 and is provided with an opening 20b. A flare 20c that expands outward is formed in the opening 20b.

The cup-shaped container 20 is fixed by welding to the bottom plate 12a of the closure shell at the flare 20c.

A plurality of communication holes 23 are formed in the circumferential wall 22 and closed by a seal tape prior to actuation.

The interior of the cup-shaped container 20 serves as an ignition device chamber 30 where an ignition device is accommodated.

In FIG. 1, a known electric igniter 32 and a known explosives or gas generating agent (not shown in the drawing) are used as the ignition device. However, the electric igniter 32 alone may be also used.

The electric igniter 32 is integrally fixed to the closure shell 12 at an igniter fixing portion 33 in which the cylindrical part 12c and the annular flat portion 12d of the closure shell 12 are integrated by a resin.

A combustion chamber 40 where a known gas generating agent (not shown in the drawing) is accommodated is formed outside the cup-shaped container 20 (the ignition device chamber 30).

The combustion chamber 40 and the ignition device chamber 30 are communicated with each other through a communication hole 23 during actuation.

An annular filter 50 is disposed in the upper section of the combustion chamber 40. The annular filter 50 is placed to be positioned between the cup-shaped container 20 and the top plate 11a of the diffuser shell 11 and is arranged at a distance (that is, so as to form an annular space 52) from the inner circumferential surface (that is, the gas discharge port 14) of the reduced diameter part 13a.

The upper surface 54 of the filter 50 is abutted against and supported by a first support member 60, and the lower surface 56 of the filter is abutted against and supported by a second support member 70.

The first support member 60 is disposed between the filter 50 and the top plate 11a of the diffuser shell 11.

Figure 2:
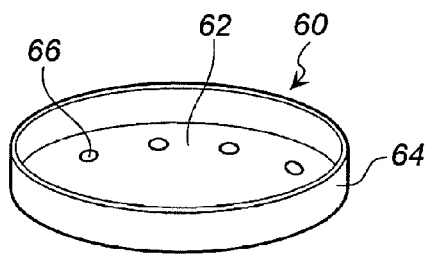
FIG. 2 shows a perspective view illustrating the state in which the first support member, arranged in the gas generator shown in FIG. 1, is turned upside down.

As shown in FIG. 2, the first support member 60 has a disk-shaped portion 62 and an annular wall portion 64 formed at the circumference of the disk-shaped portion 62.

The first support member 60 is formed from iron or stainless steel, but can be also formed from a ceramic material with a low thermal conductivity. When the first support member 60 is formed from iron, the thickness thereof is about 0.5 mm to 1.0 mm.

A plurality of communication holes 66 is formed in the disk-shaped portion 62, being arranged in the circumferential direction. The communication holes 66 are located to abut against the upper surface 54 of the filter in the state shown in FIG. 1. In other words, the communication holes 66 are closed by the upper surface 54 of the filter.

In the embodiment shown in FIG. 1, the sum total of the total opening surface area (A1) of the plurality of communication holes 66 and the cross-sectional area (A2) of the outer circumferential surface of the filter 50 exposed between the first support member 60 and the second support member 70 is larger than the total opening surface area (A3) of the gas discharge port 14 (A1+A2>A3).

Further, the total opening surface area (A1) of the plurality of communication holes 66 is larger than any cross-sectional area of the discharge path of gas from the combustion chamber 40 to the gas discharge port 14.

The first support member 60 is disposed such that one surface side of the disk-shaped portion 62 is abutted against the top plate 11*a*, the other surface side of the disk-shaped portion 62 is abutted against the upper surface 54 of the filter, and the annular wall portion 64 is abutted against a part of the outer circumferential surface 55 of the filter 50.

In this case, all of the communication holes 66 of the disk-shaped portion 62 are abutted against the upper surface 54 of the filter 50.

The second support member 70 has a substantially cylindrical wall portion 70*b*, and an annular flat portion 70*a* formed at a circumference on one end of the substantially cylindrical wall portion 70*b*.

The outer diameter of the substantially cylindrical wall portion 70*b* and the inner diameter of the closure shell 12 (the lower circumferential wall plate 16) are adjusted such that the substantially cylindrical wall portion 70*b* is press-fitted into and fixed to the closure shell 12.

The second support member 70 also has an annular step 70*c* between the substantially cylindrical wall portion 70*b* and the annular flat portion 70*a*.

The second support member 70 also has a protrusion 70*d* that protrudes upward (toward the top plate 11*a*) from the inner circumference of the annular flat portion 70*a*.

The protrusion 70*d* may be provided as necessary, and when the protrusion 70*d* is provided, a depression 58 is provided at a position opposite to the protrusion 70*d*, in the lower surface 56 of the filter 50, such that the protrusion 70*d* is inserted therein.

A size and a shape of the protrusion 70*d* and the depression 58 are adjusted so that they are fitted to each other. For example, when an annular protrusion 70*d* is provided, an annular depression (an annular groove) 58 is formed, and when a plurality of independent protrusions 70*d* is provided, a plurality of independent depressions 58 is formed.

The second support member 70 is disposed such that the substantially cylindrical wall portion 70*b* is fixed to the lower circumferential wall plate 16 of the closure shell 12, and the annular flat portion 70*a* is abutted against the lower surface 56 of the filter 50.

The position at which the substantially cylindrical wall portion 70*b* is fixed to the lower circumferential wall plate 16 is set within a range of 0.2 H to 0.9 H from the bottom plate 12*a*, where H is the height from the bottom plate 12*a* to the top plate 11*a*, so as to minimize the heat transfer from the filter 50 and the combustion residues located in the vicinity thereof to the top plate 11*a* via the second support member 70 and the lower circumferential wall plate 16.

The second support member 70 is disposed such that the height position of the annular step 70*c* is below (on the bottom plate 12*a* side) the circumferential wall step 13*c* of the diffuser shell 11 and that a gap is formed between the annular step 70*c* and the circumferential wall step 13*c*.

An example of the method for assembling the gas generator 1 shown in FIG. 1 will be explained below.

(I) The gas generating agent is charged into the combustion chamber 40 in the closure shell 12 attached with the igniter 32 and the cup-shaped container 20.

(II) The second support member 70 is press-fitted into and fixed to the closure shell 12. In this case, the press-fitting and fixing are performed such that the height position of the annular step 70*c* is lower than the circumferential wall step 13*c* of the diffuser shell 11, and a gap is formed therebetween.

(III) The filter 50 is placed on the annular flat portion 70*a* of the second support member 70. In this case, when the second support member 70 has the protrusion 70*d* and the filter 50 has the corresponding depression 58, the protrusion 70*d* is arranged to be fitted into the depression 58. As a result, the filter 50 is easily positioned and the filter 50 is prevented from shifting during assembling.

(IV) After the gas generating agent is further charged, as necessary, the first support member 60 is set to cover the upper surface 54 of the filter 50.

(V) The diffuser shell 11 is set to cover the closure shell 12 and the contact portion thereof is integrated by welding.

In this case, the top plate 11*a* of the diffuser shell 11 is placed to abut against the disk-shaped portion 62 of the first support member 60, and it is preferred that the top plate 11*a* is placed to be in intimate contact with the disk-shaped portion 62. As a result, the filter 50 is fixed more tightly by the first support member 60 and the second support member 70.

Figure 3:
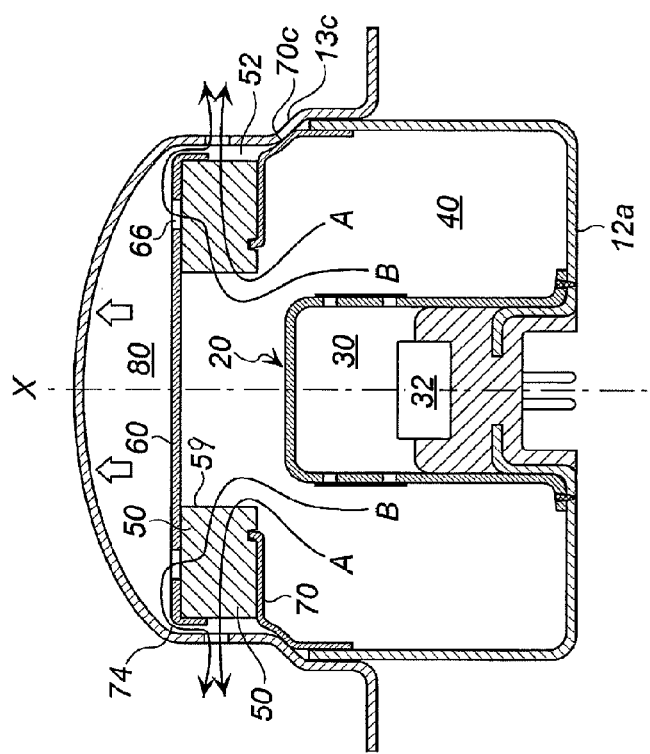
FIG. 3 shows a cross-sectional view taken during actuation of the gas generator shown in FIG. 1.

The operation of the gas generator 1 shown in FIG. 1 will be explained below with reference to FIG. 1 and FIG. 3. FIG. 3 illustrates the gas generator 1 shown in FIG. 1 in actuation.

When the igniter 32 is actuated, the gas generating agent (not shown in the drawing) inside the ignition device chamber 30 is ignited and burned, thereby generating combustion products.

The combustion products are released from the communication holes 23 into the combustion chamber 40, the gas generating agent (not shown in the drawing) located inside the combustion chamber 40 is ignited and burned to generate combustion gas.

In this case, a load acts in the axis X direction such as shown by the arrows in FIG. 3 by the pressure of the combustion gas. Therefore, the top plate 11*a* of the housing 10 is deformed. A similar load also acts in the X axis direction on the bottom plate 12*a* of the closure shell 12, and the bottom plate 12*a* is also deformed.

The second support member 70 receives the pressure and moves toward the top plate 11*a*. However, since the annular step 70*c* comes into contact with the circumferential wall step 13*c*, subsequent movement is inhibited. Therefore, the boundary section between the disk-shaped portion 62 and the annular wall portion 64 of the first support member 60 does not come into contact with the top plate 11*a* of the diffuser shell 11 and an annular gap 74 is formed.

The combustion gas generated in the combustion chamber 40 enters the filter 50 from the inner circumferential surface 59 of the filter, passes through the annular space 52, ruptures the seal tape, and is discharged from the gas discharge port 14. Thus, the gas flow such as shown by the arrow A is formed (a principal discharge path).

When the top plate 11*a* of the diffuser shell deforms as shown in FIG. 3 due to the increase in pressure in the combustion chamber 40, a space (heat transfer inhibiting space) 80 is formed between the first support member 60 and the top plate 11*a*.

This is because the communication holes 66 formed in the first support member 60 have a sufficiently large total opening surface area and therefore the difference in pressure between the combustion chamber 40 and the space 80, which acts upon the disk-shaped portion 62 of the first support member 60, is decreased, and the disk-shaped portion 62 is substantially not deformed.

Further, in the state shown in FIG. 3, the top plate 11a of the diffuser shell 11 and the boundary section between the disk-shaped portion 62 and the annular wall 64 of the first support member 60 are spaced from each other, and an annular gap 74 is formed, due to interaction of the annular step 70c and the circumferential wall step 13c.

The annular gap 74 serves as a gas passage, and the second gas flow shown by the arrow B in the drawing is formed (an auxiliary discharge path). In this case, since the combustion gas is discharge into the space 80 through the communication holes 66 after passing through the filter 50, the combustion gas is sufficiently cooled and purified.

In the invention, during actuation, a gap is formed between the top plate and the first support member; and a gap is formed between the upper circumferential wall plate and the first support member. This means a gap being formed between the top plate and the upper circumferential wall plate, and the first support member.

After the actuation, the temperature of the filter 50 is raised by the heat accumulated from the collected residues and the combustion gas passing through the filter.

However, in the gas generator 1 in accordance with the present invention, since the space (heat transfer inhibiting space) 80 is formed, as shown in FIG. 3, the heat accumulated in the filter 50 and the heat of combustion residues present therearound are hardly transferred to the top plate 11a of the diffuser shell 11, and the excess increase in temperature of the top plate 11a is prevented.

When the combustion gas is discharged by the flow shown by the arrow B, the combustion gas passes through the communication holes 66 and then collides with the inner surface of the top plate 11a. However, the collision time is extremely short, and it hardly occurs that the combustion gas directly increase temperature of the top plate 11a. Further, the residues contained in the combustion gas are filtered by the filter 50, substantially no combustion residues pass through the communication holes 66, and therefore, the residues hardly increase temperature of the top plate 11a.

In order to increase the effect of preventing the heat transfer from the filter 50 to the top plate 11a of the diffuser shell 11, the second support member 70 can be formed from a material with a thermal conductivity higher than that of the first support member 60.

For example, when the first support member 60 is formed from iron or stainless steel, the second support member 70 is formed from aluminum or copper. It is also possible to increase the contact surface area of the second support member 70 and the lower circumferential wall plate 16 of the closure shell 12, thereby moving a larger amount of heat of the filter 50 to the closure shell 12.

Instead of the annular-shaped filter 50, the filter in the flat-plated (circular plate) shape may be employed such that, for example, the lower surface 56 of the filter 50 does not interfere with the bottom surface 20a of the cup-shaped container 20. In this case, the first support member 60 and the second support member 70 may be used. The flat-plated filter also be available not only to the embodiment for the first aspect of the invention, but also to the above-mentioned second aspect of the invention.

Figure 4:
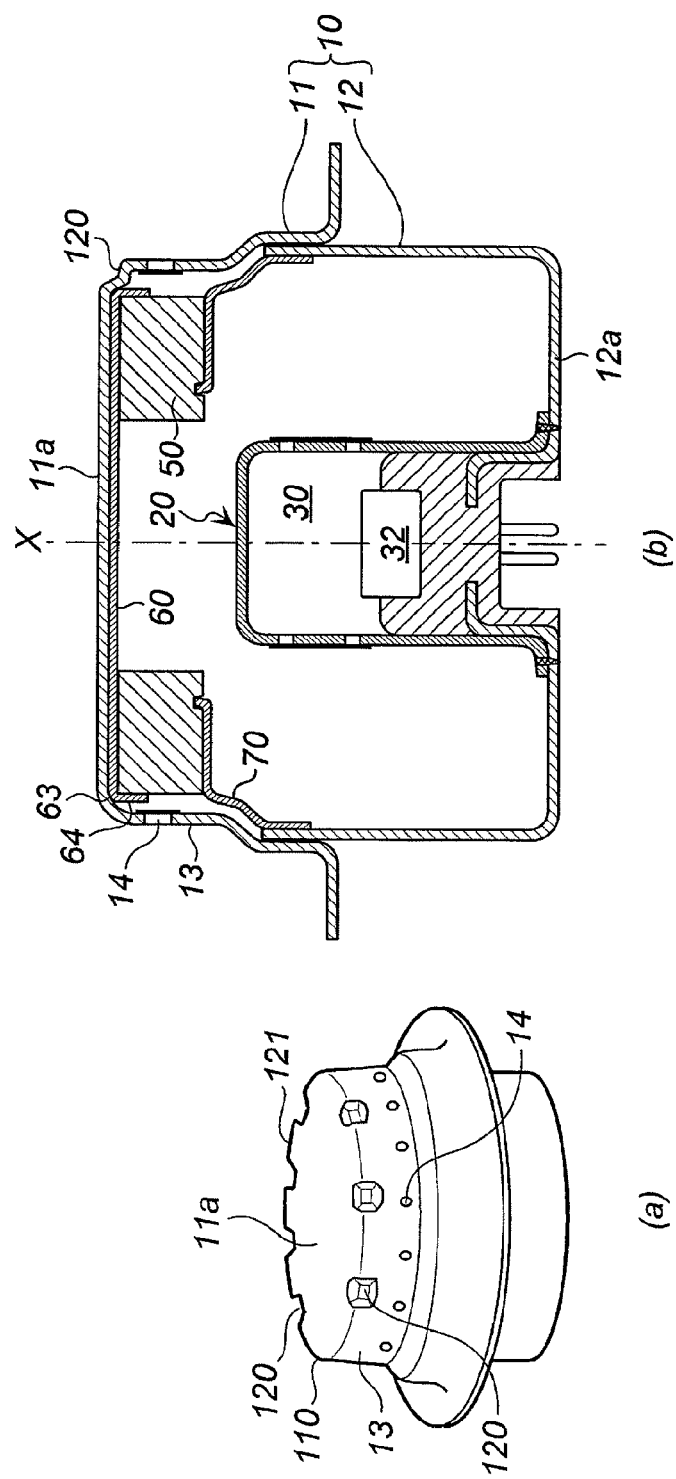
FIG. 4 shows, in (a), a perspective view of the gas generator of another embodiment, and, in (b), a cross-sectional view in the axis X direction of the gas generator in (a).

(2) Gas Generator Shown in FIG. 4

The gas generator 1 shown in FIG. 4 is similar to the gas generator 1 shown in FIG. 1, except that a plurality of concave portions 120 is formed with a spacing therebetween in a boundary section 110 of the top plate 11a and the reduced diameter part 13a of the diffuser shell 11.

As shown in (a) in FIG. 4, in the boundary section 110, a plurality of concave portions 120 is formed with a spacing therebetween in the circumferential direction. A plurality of convex portions 121 is present between the plurality of concave portions 120 (the portions concaved inward of the housing).

When viewed from the inside of the housing 10, the plurality of concave portions 120 is a plurality of convex portions, and the plurality of convex portions 121 is likewise a plurality of concave portions.

In a state before the gas generator is actuated, the distal ends of the plurality of concave portions 120 are abutted against the boundary section 63 between the disk-shaped portion 62 and the annular wall portion 64 of the first support member 60, and a gap (a gap corresponding to the depth of the concave portions 120) is present between the plurality of convex portions 121 and the boundary section 63.

When the gas generator shown in FIG. 4 is actuated, the top plate 11a is deformed in the same manner as in FIG. 3, and the space (heat transfer inhibiting space) 80 is formed between the top plate 11a and the disk-shaped portion 62.

Meanwhile, the boundary section 63 in the first support member 60 remains abutting against the distal ends of the plurality of concave portions 120.

Therefore, a gas flow channel is formed in the gap (gap corresponding to the depth of the concave portions 120) between the plurality of convex portions 121 and the boundary section 63, and the gas inside the space 80 reaches the annular space 52 through this flow channel and is discharged from the gas discharge port 14.

Therefore, in the gas generator shown in FIG. 4, two gas discharge paths, such as shown by the arrows A and B in FIG. 3, are also ensured during actuation.

Further, since the boundary section 110 of the top plate 11a and the boundary section 63 of the first support member 60 are abutted against each other only at the distal ends of the plurality of concave portions 120, heat of the filter 50 and combustion residues is prevented from transferring to the top plate 11a through the first support member 60.

Furthermore, even after actuation, the first support member 60 and the filter 50 are supported from above by the distal ends of the plurality of concave portions 120, and therefore the occurrence of noise caused by moving of the parts after actuation is prevented.

Figure 5:
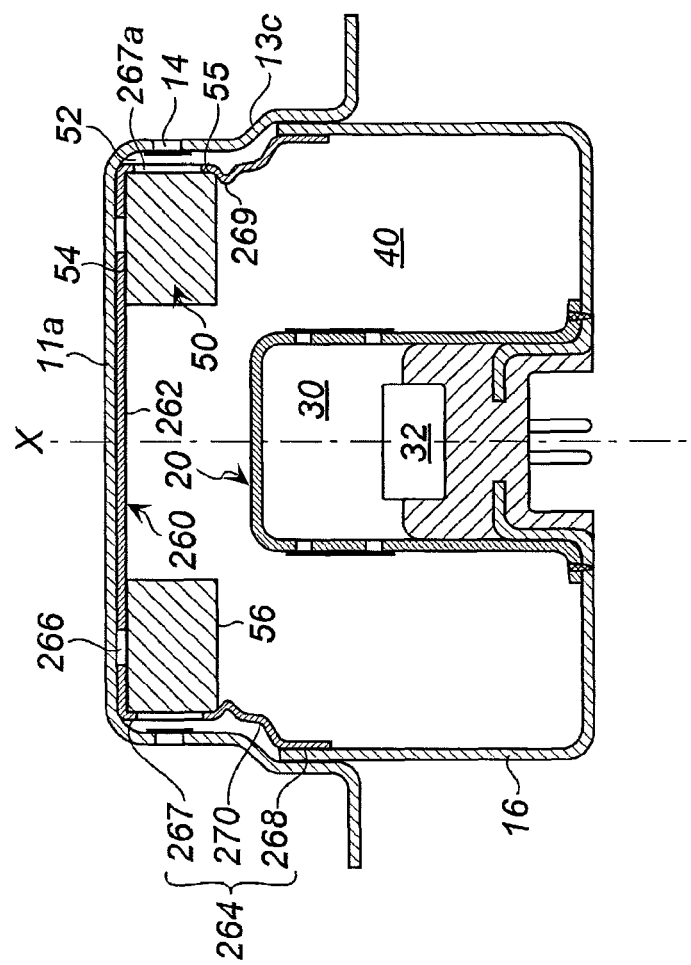
FIG. 5 shows a cross sectional view in the axis X direction of the gas generator of another embodiment (a cross-sectional view illustrating the state prior to actuation).

(3) Gas Generator Shown in FIG. 5

The gas generator shown in FIG. 5 is similar to the gas generator 1 shown in FIG. 1, except that a single cup-shaped support member is used instead of the two members, namely, the first support member 60 and the second support member 70, used in the gas generator shown in FIG. 1.

A cup-shaped support member 260 has a disk-shaped portion 262 and a cylindrical wall portion 264 formed at the outer circumference of the disk-shaped portion 262.

The disk-shaped portion 262 has a plurality of communication holes 266 only in a portion that is in contact with the upper surface 54 of the filter 50.

The cylindrical wall portion 264 has a reduced diameter part 267 abutted against the outer circumferential surface 55 of the filter 50 and an enlarged diameter part 268 abutted against the lower circumferential wall plate 16 of the closure shell 12. The outer diameter of the enlarged diameter part 268 is larger than the outer diameter of the reduced diameter part 267.

A plurality of communication holes 267a is formed in the reduced diameter part 267.

A protrusion 269 protruding toward the axis X side (toward the center of the housing) is present at the inner circumferential surface between the reduced diameter part 267 and the enlarged diameter part 268.

An annular step 270 is present between the protrusion 269 and the enlarged diameter part 268.

In the cup-shaped support member 260, one surface side of the disk-shaped portion 262 is abutted against the top plate 11a, and the other surface side of the disk-shaped portion 262 is abutted against the upper surface 54 of the filter.

The reduced diameter part 267 of the cylindrical wall portion is abutted against the outer circumferential surface 55 of the filter. The annular space 52 is formed between the reduced diameter part 267 and the reduced diameter part 13a of the diffuser shell (where the gas discharge port 14 is formed).

The protrusion 269 is abutted against the outer circumferential surface 55 (an outer circumference) of the lower surface 56 of the filter. Therefore, unlike the filter 50 shown in FIG. 1, a larger portion of the lower surface 56 of the filter is exposed inside the combustion chamber 40.

The enlarged diameter part 268 of the cylindrical wall portion is press-fitted to the lower circumferential wall plate 16 of the closure shell.

The position at which the enlarged diameter part 268 is fixed to the lower circumferential wall plate 16 is set within a range of 0.2 H to 0.9 H from the bottom plate 12a, where H is the height from the bottom plate 12a to the top plate 11a, in order to minimize the heat transfer from the filter 50 and the combustion residues to the top plate 11a via the enlarged diameter part 268 and the lower circumferential wall plate 16.

Further, the cup-shaped support member 260 is disposed such that the height position of the annular step 270 is below (on the bottom plate 12a side) the circumferential wall step 13c of the diffuser shell 11, and that a gap is formed between the annular step 270 and the circumferential wall step 13c.

The total opening surface area (A1) of the communication holes 266 formed in the disk-shaped portion 262, the total opening surface area (A4) of the communication holes 267a of the cylindrical wall portion (the reduced diameter part 267), and the total opening surface area (A3) of the gas discharge port 14 satisfy the relation A1+A4>A3, and the relationship A1<A4.

Further, the (A1+A4)/A3 ratio is adjusted to a range of 4 to 80.

The operation of the gas generator shown in FIG. 5 is substantially same as that of the gas generator shown in FIG. 1.

Figure 6:
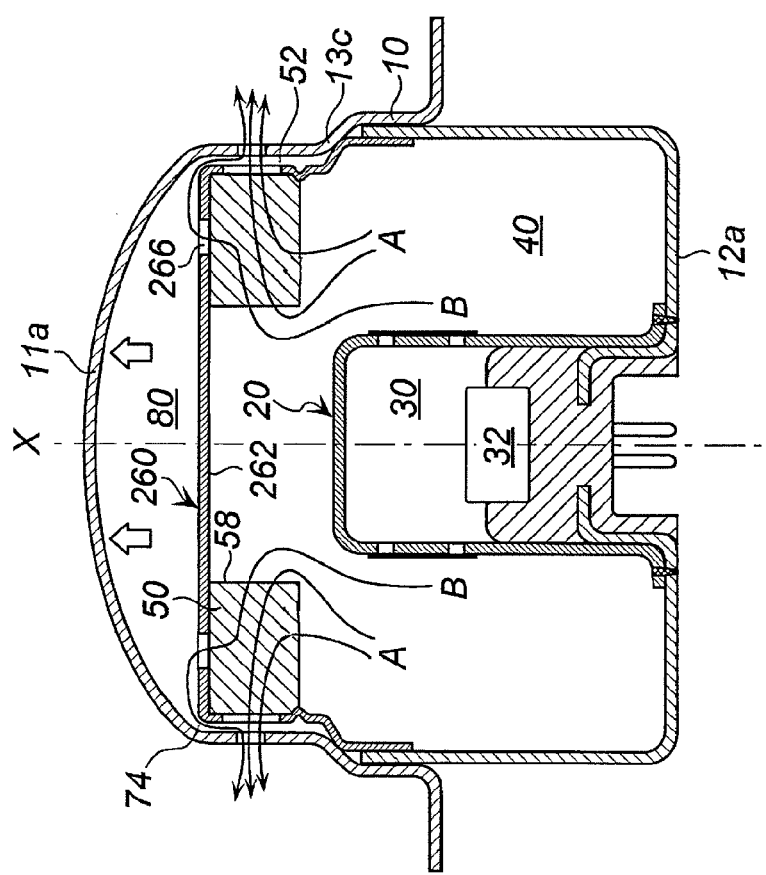
FIG. 6 shows a cross-sectional view taken during actuation of the gas generator shown in FIG. 5.

When the gas generator shown in FIG. 5 is actuated, the state shown in FIG. 6 is assumed, and the combustion gas is discharged from the gas discharge port 14 via two gas discharge paths shown by the arrows A and B.

Figure 7:
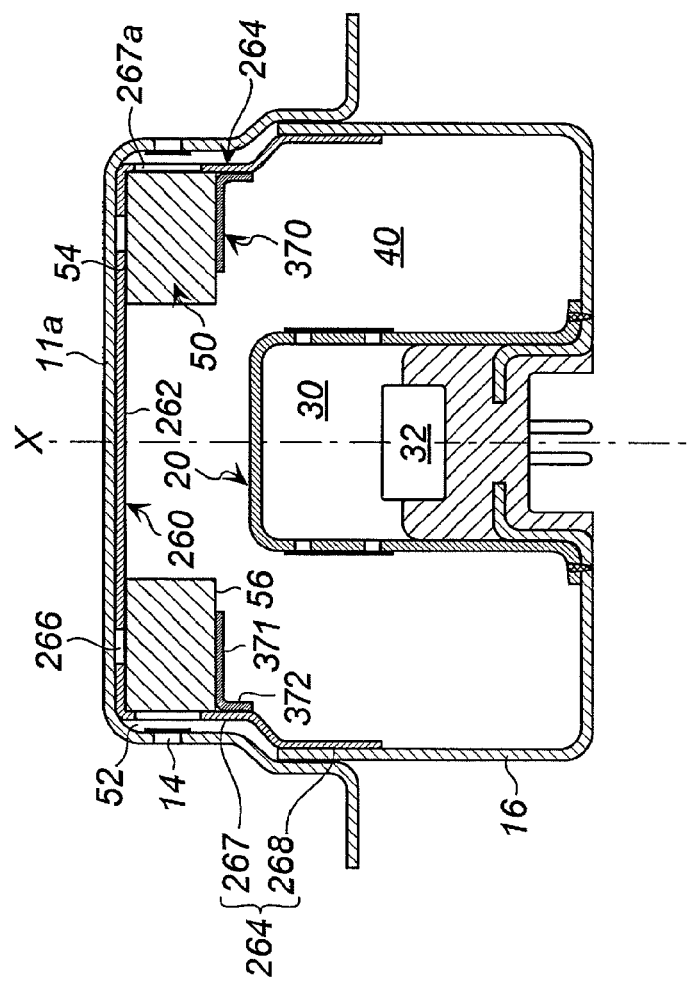
FIG. 7 is a cross-sectional view in the axis X direction of the gas generator of yet another embodiment (a cross-sectional view illustrating the state prior to actuation).

(4) Gas Generator Shown in FIG. 7

The gas generator shown in FIG. 7 is similar to the gas generator shown in FIG. 5, except that an annular member 370 is assembled with the cup-shaped support member 260 used in the gas generator shown in FIG. 5, to support the annular filter 50.

In the cup-shaped support member 260 shown in FIG. 7, the protrusion 269 formed in the cylindrical wall portion 264 of the cup-shaped support member 260 shown in FIG. 5 is not formed, but the protrusion may be formed.

The annular member 370 has an annular flat portion 371 and an annular wall surface 372.

The annular wall surface 372 is pressed against the reduced diameter part 267 of the cup-shaped support member 260.

The annular flat portion 371 is abutted against the lower surface 56 of the annular filter 50.

The gas generator shown in FIG. 7 operates similarly to the gas generator shown in FIG. 5.

The invention thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A gas generator comprising:
   a diffuser shell which has a top plate and an upper circumferential wall plate provided with a gas discharge port, a closure shell which has a bottom plate and a lower circumferential wall plate, a housing, as an outer shell, obtained by joining and integrating only the upper circumferential wall plate and the lower circumferential wall plate,
   in the housing,
   an ignition device chamber defined by a cup-shaped container which accommodates an ignition device,
   a combustion chamber defined to surround the ignition device chamber and charged with a gas generating agent,
   an annular or flat-plate filter disposed to face the top plate and to be spaced from the upper circumferential wall plate,
   a first support member abutting against and supporting an upper surface of the filter,
   a second support member abutting against and supporting an lower surface of the filter,
   the first support member including,
   a disk-shaped portion and an annular wall portion, the disk-shaped portion provided with a plurality of communication holes formed only at a section in contact with the upper surface of the filter,
   one surface of the disk-shaped portion abutting against the top plate, the other surface of the disk-shaped portion abutting against the upper surface of the filter, the annular wall portion abutting against a part of an outer circumferential surface of the filter;
   the second support member including,
   a substantially cylindrical wall portion and an annular flat portion formed at a circumference in one end of the substantially cylindrical wall portion, and
   the substantially cylindrical wall portion being fixed to the housing, the annular flat portion abutting against the lower surface of the filter,
   and, during actuation, a gap being formed between the top plate and the first support member; and a gap being formed between the upper circumferential wall plate and the first support member,
   when a pressure inside the combustion chamber increases due to combustion gas generated by combustion of the gas generating agent and the top plate of the diffuser shell is deformed.

2. The gas generator according to claim 1, wherein
   a circumferential wall step is formed in a circumferential wall plate including the upper circumferential wall plate and the lower circumferential wall plate,
   the second support member has an annular step between the substantially cylindrical wall portion and the annular flat portion,
   a step surface of the annular step is formed to be abutted against a step surface of the circumferential wall step, a gap is present between the step surface of the circumferential wall step and the step surface of the annular step prior to actuation, and the step surface of the annular step is abutted against the step surface of the circumferential wall step during actuation.

3. The gas generator according to claim 1, wherein the second support member further has a protrusion that protrudes towards the top plate of the diffuser shell at a circumference of the annular flat portion, the filter has a depression for inserting the protrusion at the lower surface abutted against the annular flat portion, and the second support member is arranged such that the substantially cylindrical wall portion is fixed to the housing, the annular flat portion is abutted against the lower surface of the filter, and the protrusion is inserted into the depression in the lower surface of the filter.

4. The gas generator according to claim 1, wherein a plurality of concave portions concaved to an inside of the housing are formed with a spacing therebetween in the top plate of the diffuser shell or in a boundary section of the top plate and the upper circumferential wall plate of the diffuser shell, the first support member has the annular wall portion at a circumference of the disk-shaped portion, and a distal end of the plurality of concave portion is abutted against a portion including a boundary section of the disk-shaped portion and the annular wall portion of the first support member.

5. The gas generator according to claim 1, wherein the second support member is formed from a metal with a higher thermal conductivity than that of the first support member.

6. A gas generator comprising:

a diffuser shell which has a top plate and an upper circumferential wall plate provided with a gas discharge port, a closure shell which has a bottom plate and a lower circumferential wall plate, a housing, as an outer shell, obtained by joining and integrating only the upper circumferential wall plate and the lower circumferential wall plate, in the housing, an ignition device chamber defined by a cup-shaped container which accommodates an ignition device, a combustion chamber defined to surround the ignition device chamber and charged with a gas generating agent, an annular or flat-plate filter disposed to face the top plate and to be spaced from the upper circumferential wall plate, a single cup-shaped support member abutting against at least an upper surface of the filter to support the filter, the single cup-shaped support member having a disk-shaped portion and a cylindrical wall portion formed at the circumference of the disk-shaped portion and provided with a communication hole, the disk-shaped portion being provided with a plurality of communication holes formed only at a section in contact with an upper surface of the filter, one surface of the disk-shaped portion abutting against the top plate and the other surface of the disk-shaped portion abutting against the upper surface of the filter, and at least part of the cylindrical wall portion being arranged to abut against an outer circumference of the filter, an opening end of the cylindrical wall portion fixed to the housing, and, during actuation, a gap being formed between the top plate and the first support member; and a gap being formed between the upper circumferential wall plate and the first support member, when a pressure inside the combustion chamber increases due to combustion gas generated by combustion of the gas generating agent and the top plate of the diffuser shell is deformed.

7. The gas generator according to claim 6, wherein the cup-shaped support member has the disk-shaped portion, a cylindrical wall portion formed at a circumference of the disk-shaped portion, and a protrusion formed in an inner circumferential surface of the cylindrical wall portion, and the disk-shaped portion has the plurality of communication holes only in a section that is in contact with the upper surface of the filter, one surface of the disk-shaped portion is abutted against the top plate, and the other surface of the disk-shaped portion is abutted against the upper surface of the filter, the protrusion is abutted against a circumference of a lower surface of the filter, and at least part of the cylindrical wall portion is arranged to be abutted against an outer circumferential surface of the filter.

8. The gas generator according to claim 6, wherein a circumferential wall step is formed in a circumferential wall plate including the upper circumferential wall plate and the lower circumferential wall plate, the cup-shaped support member has an annular step at the cylindrical wall portion, a step surface of the annular step is formed to be abutted against a step surface of the circumferential wall step, a gap is present between the step surface of the circumferential wall step and the step surface of the annular step prior to actuation, and the step surface of the annular step is abutted against the step surface of the circumferential wall step during actuation.

9. The gas generator according to claim 6, wherein the annular or flat-plate filter is supported by the single cup-shaped support member abutted against at least the upper surface of the filter, and an annular member having an annular flat portion and an annular wall surface, and in the annular member, the annular wall surface is abutted against the cylindrical wall portion of the cup-shaped support member, and the annular flat portion is abutted against the lower surface of the annular or flat-plate filter.

* * * * *